United States Patent
Uemura

[15] 3,653,456
[45] Apr. 4, 1972

[54] CONTROL SYSTEM FOR MOVING VEHICLE ALONG A PREDETERMINED PATH

[72] Inventor: Saburo Uemura, Yokohama, Japan
[73] Assignee: Sony Corporation, Tokyo, Japan
[22] Filed: Mar. 24, 1970
[21] Appl. No.: 22,279

[30] Foreign Application Priority Data

Apr. 14, 1969 Japan..............................44/28835

[52] U.S. Cl. ..............................................180/98
[51] Int. Cl. ..............................................B62d 1/24
[58] Field of Search ...............180/98, 79, 79.1; 104/149; 46/236

[56] References Cited

UNITED STATES PATENTS

| | | | |
|---|---|---|---|
| 3,474,877 | 10/1969 | Wesener | 180/98 |
| 2,493,755 | 1/1950 | Ferrill | 180/98 |
| 2,794,929 | 6/1957 | Adamski | 180/79.1 X |
| 2,903,821 | 9/1959 | Favre | 180/79 X |
| 3,085,646 | 4/1963 | Paufve | 180/98 |
| 3,179,918 | 4/1965 | Hoeppel | 180/98 X |
| 3,550,716 | 12/1970 | Wickstrom | 180/98 |

Primary Examiner—Kenneth H. Betts
Attorney—Lewis H. Eslinger, Alvin Sinderbrand and Curtis, Morris & Safford

[57] ABSTRACT

A control system for directing a movable vehicle along a predetermined course has a transversely magnetized guiding element extending along the course, a plurality of dual-gap magnetic flux responsive heads spaced apart on the movable vehicle in the direction of movement of the latter and each being arranged so that the direction across the gaps of the head extends substantially transversely with respect to the magnetized guiding element, and circuits connected with the heads to provide control signals indicative of deviations of the vehicle from the course and by which steering of the vehicle is controlled for maintaining the vehicle on the course. Additional magnetic heads may be provided on the vehicle to detect the magnetic fields of associated magnets arranged at selected locations along the course, and circuits are connected to such additional heads to provide respective control signals by which the speed of movement and/or stopping of the vehicle are controlled.

9 Claims, 12 Drawing Figures

Patented April 4, 1972 3,653,456

INVENTOR
SABURO UEMURA
BY
ATTORNEY

INVENTOR
SABURO UEMURA
ATTORNEY

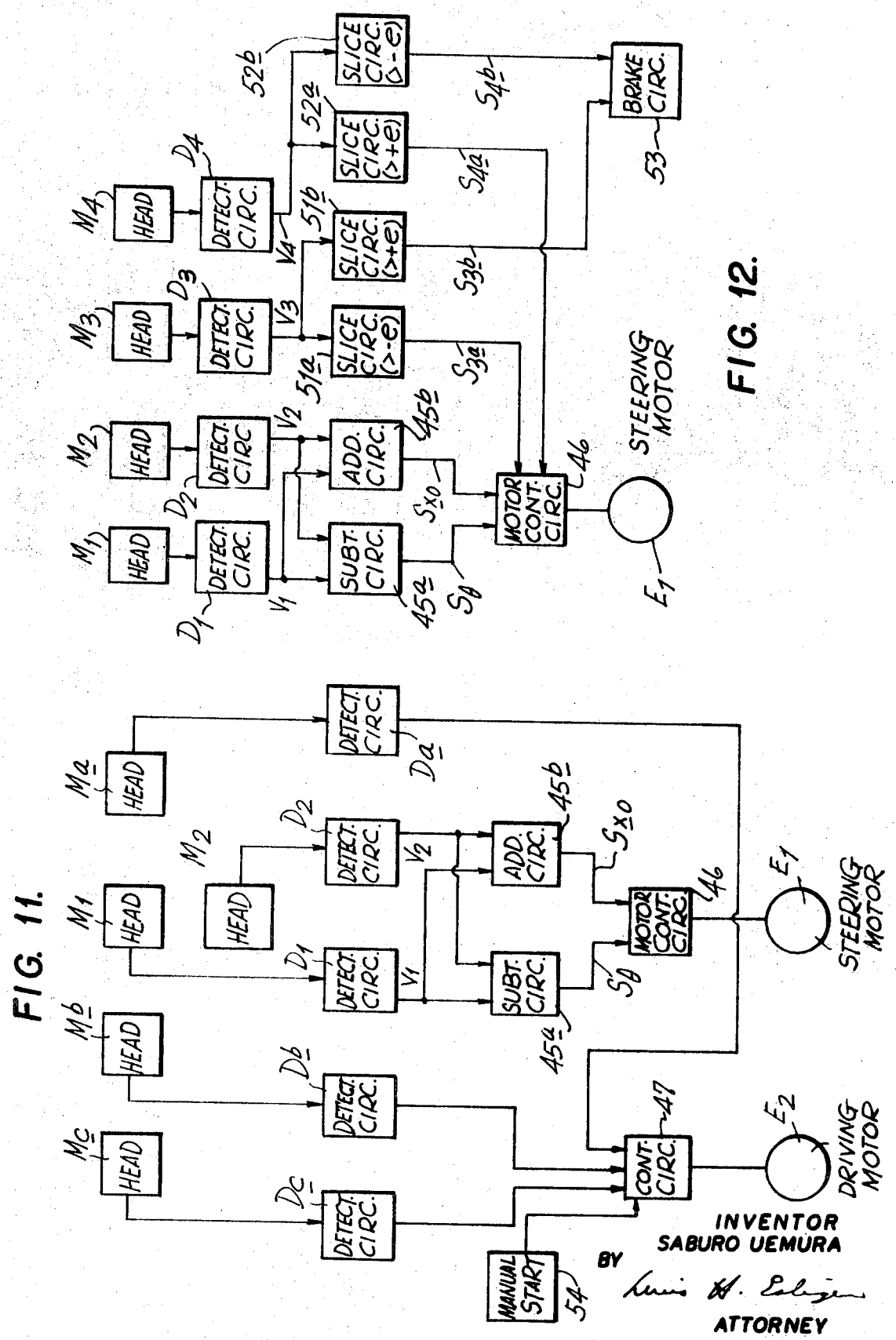

CONTROL SYSTEM FOR MOVING VEHICLE ALONG A PREDETERMINED PATH

This invention relates generally to the automatic control of movable vehicles, and more particularly to a system by which a movable vehicle may be automatically controlled for movement along a predetermined course.

Heretofore, systems for conducting vehicles along a predetermined course have usually included tracks or rails extending along the course and by which the vehicle wheels are steered as well as being supported. Obviously, such systems have not permitted easy and economical changing of the course which required rearrangement of the tracks or rails and the supporting structures therefor. Other previously proposed systems in which the vehicle wheels travel on a plane supporting surface, such as a factory floor or paved roadway, and the vehicle is steered by the cooperative engagement of a sensor on the vehicle with a guiding element that defines the path or course to be followed, are disadvantageous in that the physical engagement of the sensor with the guiding element leads to wear and thus reduces the useful life and reliability of the system.

Accordingly, it is an object of this invention to provide a control system for guiding a movable vehicle along a predetermined course which may be economically and easily changed.

Another object is to provide a control system, as aforesaid, in which the vehicle can ride on a plane surface, such as a factory floor or paved roadway.

Another object is to provide a control system as aforesaid, in which the course to be followed by the vehicle is defined by a guiding element which may be simply laid upon the plane supporting surface or inset therein, and in which deviations of the vehicle from such course are detected without physical contact with the guiding element and steering corrections are made accordingly to return the vehicle to the desired course.

Still another object is to provide a control system for guiding a movable vehicle so as to cause the latter to accurately follow a predetermined course.

A further object is to provide a control system, as aforesaid, which embodies relatively low cost components.

In accordance with an aspect of this invention, the guiding element defining the course to be followed by the vehicle is transversely magnetized and deviations of the vehicle from such course are detected by means of a plurality of dual-gap magnetic flux responsive heads spaced apart on the movable vehicle in the direction of movement of the latter and each being arranged so that the direction across the gaps of the head extends substantially transversely with respect to the magnetized guiding element, with circuits being connected to the heads to provide control signals indicative of deviations of the vehicle from the defined course and by which steering of the vehicle is controlled for maintaining the vehicle on the course.

The above, and other objects, features and advantages of this invention, will be apparent in the following detailed description of illustrative embodiments thereof which is to be read in connection with the accompanying drawings, wherein:

FIG. 11 is a block wiring diagram showing circuits that may be employed in the system of FIG. 7; and FIG. 12 is another block diagram showing circuits that may be employed with the system of FIG. 9.

Figure 1:
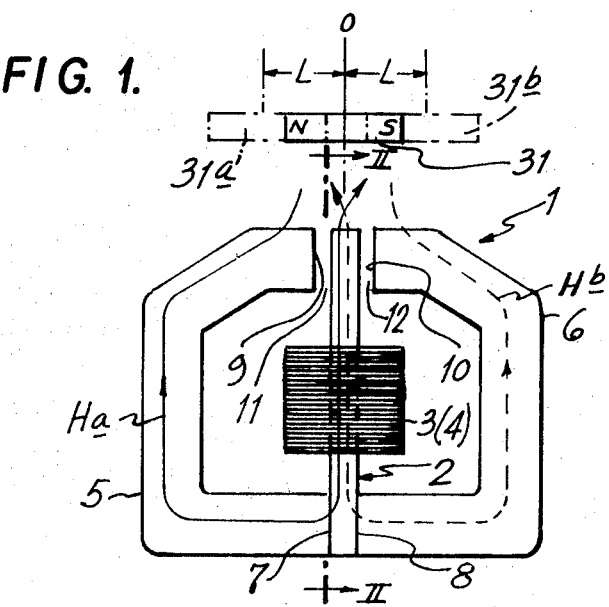
FIG. 1 is a schematic elevational view showing a dual-gap magnetic flux responsive head of a type that may be used in systems according to this invention, and which is shown in proximity to a magnetic flux generating source.
Figure 2:
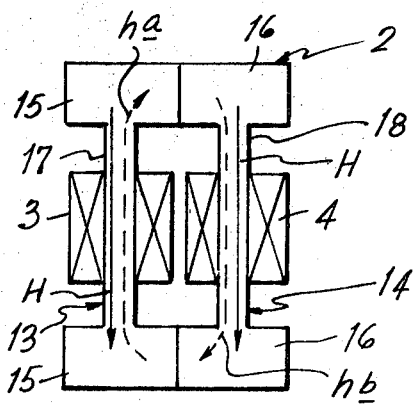
FIG. 2 is a sectional view taken along the line II—II on FIG. 1.

Referring to the drawings in detail, and initially to FIGS. 1 and 2 thereof, it will be seen that a differential-type or dual-gap magnetic flux-responsive head 1 that may be employed in a system for controlling a movable vehicle according to this invention generally comprises a saturable magnetic core 2 having two coils 3 and 4 thereon, and a pair of magnetic yokes 5 and 6. As shown, yokes 5 and 6 are of U-shaped configuration and arranged in opposing relation with core 2 therebetween so that ends 7 and 8 of yokes 5 and 7 abut, and are suitably secured to opposite sides of one end portion of core 2, while the other ends 9 and 10 of yokes 5 and 6 are adjacent to the other end portion of core 2, but spaced therefrom to define the gaps 11 and 12 therebetween. Although the gaps 11 and 12 are generally referred to as "air-gaps," it is apparent that a non-magnetic material, such as, a non-magnetic alloy of copper and beryllium or a suitable plastic resin, may fill each of the gaps 11 and 12 to provide the structural rigidity for maintaining the desired gap width.

As shown particularly on FIG. 2, in a conventional construction of the core 2, the latter is constituted by one-piece core members 13 and 14 for the coils 3 and 4, respectively, with core members 13 and 14 including relatively wide end portions 15 and 16 and relatively narrow legs 17 and 18 extending between such wide end portions and having the coils 3 and 4 respectively wound thereon.

Figure 3:
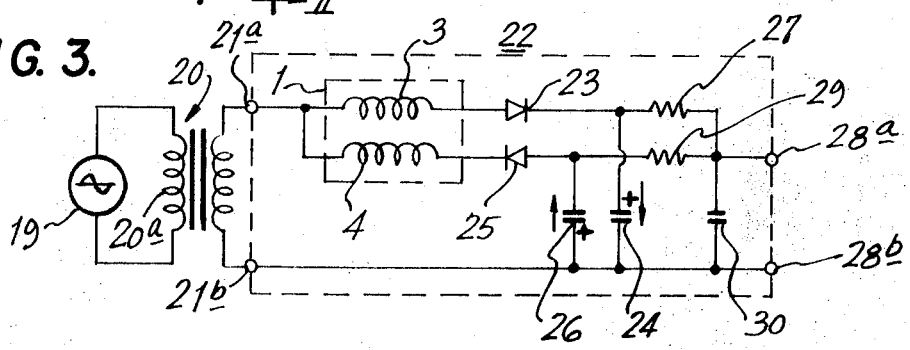
FIG. 3 is a wiring diagram showing a detecting circuit that may be used in association with the head of FIG. 1 to provide an output voltage characteristic of the magnetic flux received by the head from the source thereof.

As shown on FIG. 3, a magnetic field detecting circuit 22 for use with the head 1 has terminals 21a and 21b connected with the opposite ends of the secondary winding of a transformer 20 having its primary winding 20a receiving the output of an AC generator or oscillator 19. Within circuit 22, coils 3 and 4 are connected in series with a diode 23 and a condenser 24 to terminal 21b, and, similarly, coil 4 is connected in series with a diode 25 and a condenser 26 to terminal 21b, but with diodes 23 and 25 being conductive in opposite directions. Further, as shown, resistors 27 and 29 are connected between an output terminal 28a and junctions intermediate diode 23 and condenser 24 and intermediate diode 25 and condenser 26, respectively. The other output terminal 28b of circuit 22 is connected to junctions between condensers 24 and 26 and terminal 21b, and a DC current blocking condenser 30 is connected across terminals 28a and 28b.

With the circuit 22 as described, the current $i_a$ flows through coil 3, diode 23 and condenser 24 during one-half of the cycle of oscillator 19 and the current $i_b$ flows in the opposite direction through condenser 26, diode 25 and coil 4 during the other half of the cycle, and the oscillator has a sufficiently high frequency, for example, 100 K.Hz., in relation to the time constant of the circuit, to maintain the voltages impressed on condensers 24 and 26 in correspondence with the currents $i_a$ and $i_b$, respectively.

When the head 1 is not influenced by a magnetic field, the currents $i_a$ and $i_b$ are equal, and therefore condensers 24 and 26 are equally charged with the result that no D.C. voltage appears across output terminals 28a and 28b. However, when head 1 is influenced by a magnetic field so that a direct magnetic flux is directed through core 2, for example, as indicated by the arrows H on FIG. 2, the conditions for saturation of legs 17 and 18 of core members 13 and 14 become different by reason of the fact that the fluxes, indicated by the arrows $h_a$ and $h_b$, produced by the currents $i_a$ and $i_b$ flowing through coils 3 and 4 are in opposite directions to respectively oppose and augment the direct magnetic flux H. Therefore, the coils 3 and 4 are made to have different inductances and the maximum values of currents $i_a$ and $i_b$ are accordingly different to charge condensers 24 and 26 with different voltages. The voltage difference between the charges on condensers 24 and 26 is proportionate to the direct magnetic flux H from the external source and appears as a direct voltage across output terminals 28a and 28b. Thus, the value and direction of the direct magnetic flux from an external source can be determined by measuring the magnitude appearing as a result of the displacement to the left, by reason of the fact that the magnetic flux H$b$ becomes larger than the flux H$a$. Once again the voltage −V is maximum when the displacement toward the right attains the distance L and is reduced by further displacement, as shown on FIG. 4.

Figure 4:
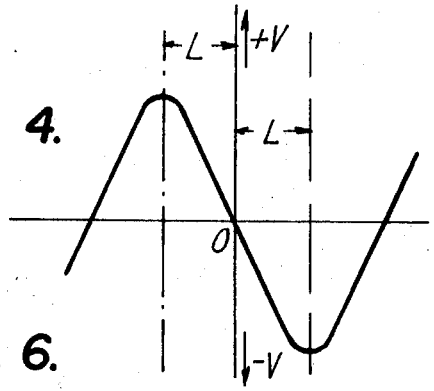
FIG. 4 is a graph showing the output voltage derived from the circuit of FIG. 3 when the head and source are displaced relative to each other as illustrated on FIG. 1.
Figure 6:
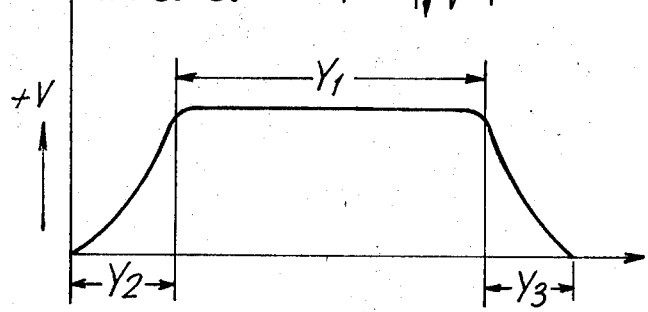
FIG. 6 is a graph illustrating the relationship of the voltage output to the relative displacement of the head and source of FIG. 5 when such relative displacement is in the direction of the longitudinal axis of the source.
Figure 5:
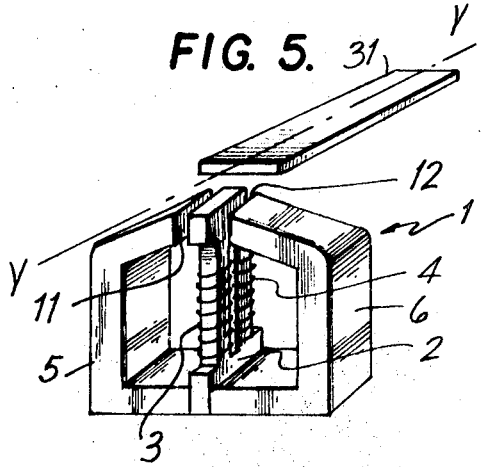
FIG. 5 is a perspective view of the head shown on FIG. 1 and a magnetic flux generating source which is elongated in the direction at right angles to the direction of its magnetization.

Referring now to FIG. 5, it will be seen that, if the magnetic flux source 31 is of substantial length in the direction at right angles to its magnetization, for example, source 31 is in the form of an elongated strip magnetized transversely, as shown, then longitudinal displacement of source 31 in the direction of the axis Y—Y on FIG. 5, that is, in the direction at right angles to the width of gaps 11 and 12, will not change the voltage output at terminals 28a and 28b so long as a portion of the strip source 31 remains proximate to the head. Thus, if strip source 31 on FIG. 5 is laterally centered with respect to head 1 to provide no voltage output, longitudinal displacement of strip source 31 will not alter that zero output. Similarly, if strip source 31 is laterally displaced from its centered position with respect to head 1, for example, to the position 31a on FIG. 1 so as to provide a maximum voltage output, as described with reference to FIGS. 1 and 4, that maximum voltage output will be maintained without change during displacement of strip source 31 in the direction of the axis Y—Y (FIG. 5) over the distance $Y_1$ (FIG. 6) which corresponds to the length of strip source 31. With further displacements of strip source 31 in the direction Y—Y, the voltage output will be progressively reduced to zero over the distances $Y_2$ (FIG. 6) which are equivalent to the dimension of head 1 in the direction Y—Y.

Figure 7:
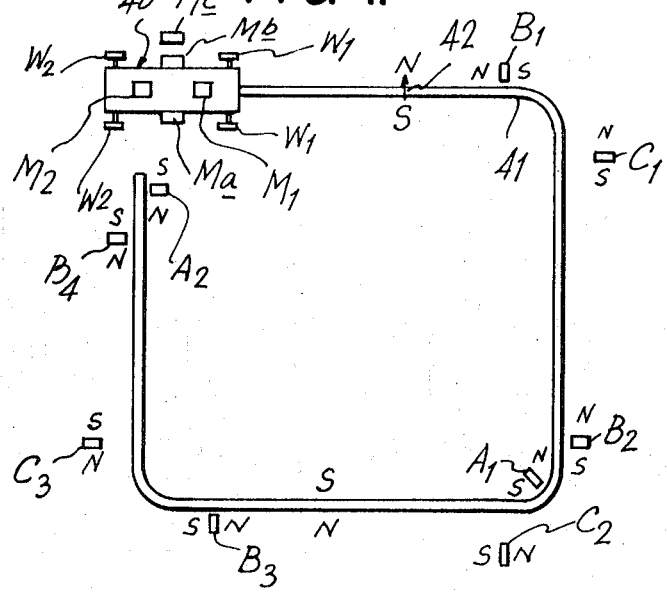
FIG. 7 is a schematic plan view of a control system for a movable vehicle according to an embodiment of this invention.
Figure 8:
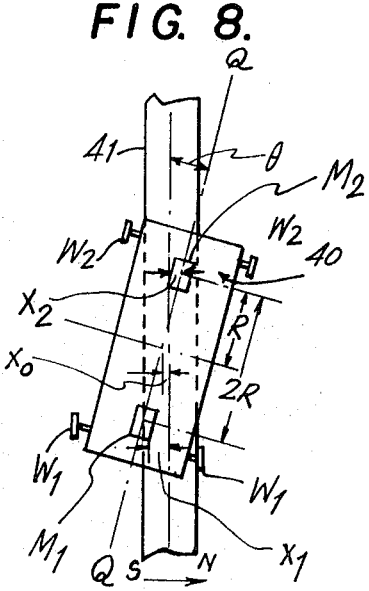
FIG. 8 is an enlarged, schematic plan view of the vehicle shown on FIG. 7, and to which reference will be made in explaining the invention.

Referring now to FIGS. 7 and 8, it will be seen that, in a control system according to this invention for directing a movable vehicle 40 along a predetermined course defined by a guiding element 41, such guiding element is in the form of a magnet which is transversely magnetized, as indicated by the arrows 42. The vehicle 40 may be a self-propelled cart, for example, as is employed for transporting articles between work stations in a factory, and has wheels $W_1$ and $W_2$, at least some of which are driven as by a battery-powered electric motor $E_2$ (FIG. 11). The wheels $W_1$ and $W_2$ are intended to ride on a plane surface, such as, a paved factory floor, and provision is made for steering the vehicle 40, as by turning of the front wheels $W_1$ in response to operation of a battery-powered, reversible electric motor $E_1$ (FIG. 11).

In accordance with this invention, vehicle 40 carries two dual-gap magnetic flux responsive heads $M_1$ and $M_2$, each of which may be of the type described above with reference to FIGS. 1 and 2 and is mounted so that the direction across its gaps extends transversely with respect to the magnetized guiding element 41. The magnetized guiding element 41 may be an elongated, flat so-called rubber magnet which is flexible so as to conform to any desired path or course and which is merely attached on the supporting surface or floor, as by a suitable cement, or inset in such surface so as to avoid interference with traffic across the defined course. The heads $M_1$ and $M_2$ are mounted on vehicle 40 so that the gaps thereof open downwardly and are proximate to guiding element 41 without making physical contact with the latter. Further, in the embodiment shown, heads $M_1$ and $M_2$ are spaced apart on vehicle 40 in the direction of movement of the latter, for example, along the longitudinal medial line Q—Q of the vehicle, by the distance 2R (in which R is the distance from each head to the center P of the vehicle).

It will be apparent that, in the system of FIGS. 7 and 8, the magnetized guiding element 41 has a relationship to each of heads $M_1$ and $M_2$ that corresponds to that of the magnetic flux source 31 to the head 1 in each of FIGS. 1 and 5. Thus, when vehicle 40 is accurately on course, that is, positioned so that each of heads $M_1$ and $M_2$ is precisely centered with respect to magnetized element 41 in the transverse direction of magnetization of the latter, detecting circuits $D_1$ and $D_2$ (FIG. 11) connected with heads $M_1$ and $M_2$, and each being similar to the circuit described with reference to FIG. 3, will provide zero output voltages. Of course, as the vehicle moves along the course defined by element 41 with its heads $M_1$ and $M_2$ precisely centered with respect to element 41, the circuits $D_1$ and $D_2$ will continue to provide zero output voltages, as is apparent from the above description with reference to FIG. 5. However, in the event that one of heads $M_1$ and $M_2$ deviates laterally from a centered position with respect to transversely magnetized element 41, the respective detecting circuit will provide an output voltage having a magnitude that corresponds to the extent of such deviation and a polarity representing the direction of such deviation.

For example, as shown on FIG. 8, if vehicle 40 is canted with respect to element 41 so that the medial line Q—Q of the vehicle is at an angle $\theta$ with respect to the medial line of element 41 and the center of head $M_1$ is deviated to the right, when facing the direction of movement of the vehicle, by the distance $x_1$ from the center of element 41, while the center of head $M_2$ is deviated to the left by the distance $-x_2$ from the center of element 41, then such deviations $x_1$ and $-x_2$ will give rise to voltage outputs $+V_1$ and $-V_2$ from detecting circuits $D_1$ and $D_2$, respectively. Such voltage outputs will be as follows:

$$V_1 = K(x_1) \qquad (1)$$
$$-V_2 = K(-x_2) \qquad (2)$$

(in which $K$ is a constant).

Further, the angle $\theta$ is represented by the voltage outputs $+V_1$ and $-V_2$ as follows:

$$\theta = \sin^{-1} \frac{x_1 - (-x_2)}{R} = \sin^{-1} \frac{[V_1 - (-V_2)]K}{R} \qquad (3)$$

It will also be apparent that, if the center P of the vehicle is laterally displaced from the center of element 41 by the distance $x_0$, such distance can be derived from the voltage outputs $+V_1$ and $-V_2$, as follows:

$$x_0 = \frac{x_1 + (-x_2)}{2} = K \frac{[V_1 + (-V_2)]}{2} \qquad (4)$$

Accordingly, the steering motor $E_1$ of vehicle 40 can be controlled in accordance with values of angle $\theta$ and lateral displacement $x_0$ derived from voltage outputs $V_1$ and $V_2$ from detecting circuits $D_1$ and $D_2$, respectively, so as to steer wheels $W_1$ for maintaining the vehicle on the desired course and for returning the vehicle to that course in the event of a deviation therefrom. For example, as shown on FIG. 11, the voltage outputs $V_1$ and $V_2$ may be applied to a subtracting circuit 45a and also applied to an adding circuit 45b which provide signal outputs S$\theta$ and S$x_0$, respectively, proportional to the values of $\theta$ and $x_0$, as calculated above. Such output signals S$\theta$ and S$x_0$ are applied to a motor control circuit 46 by which the steering motor $E_1$ is controlled to operate only when a signal S$\theta$ and/or S$x_0$ is received and to cause such operation in the direction to reduce to zero the values of $\theta$ and $x_0$.

Figure 9:
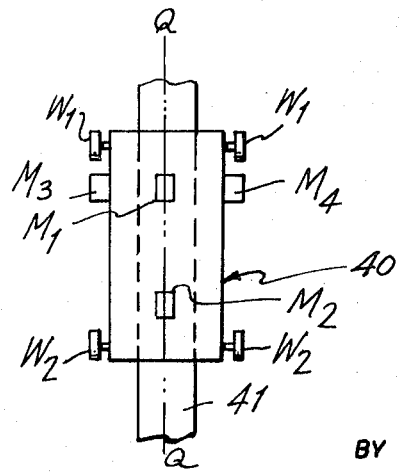
FIG. 9 is a view similar to that of FIG. 8, but showing another embodiment of the invention.

As will be apparent from the above description with reference to FIGS. 1 and 4, the magnitudes of $V_1$ and $V_2$ will increase with progressive increases in the respective distances $x_1$ and $x_2$ only up to values of such distances which correspond to the distance L on FIGS. 1 and 4 and, thereafter, further increases in distances $x_1$ and $x_2$ will be accompanied by reductions in the output voltages $V_1$ and $V_2$. With the embodiment of the invention shown on FIGS. 7 and 8, the steering response to deviations of vehicle 40 from the desired course can be made rapid enough to ensure that $x_1$ and $x_2$ do not exceed the magnitude L so long as any curved portions of the course have relatively large radii and the speed of travel along such curved portions is not excessive. However, if it is desired to operate vehicle 40 at a relatively high speed, or if the curved portions of the path or course are to have relatively small radii, then it is preferred to provide additional or supplementary heads $M_3$ and $M_4$ (FIG. 9) mounted on vehicle 40 at opposite sides of head $M_1$ and being spaced laterally from medial line Q—Q of the vehicle. The heads $M_3$ and $M_4$ may be similar to the dual-gap magnetic flux responsive heads $M_1$ and $M_2$ and are also mounted so that the direction across their gaps extends transversely, that is, in the same direction as the magnetization of element 41.

Figure 10:
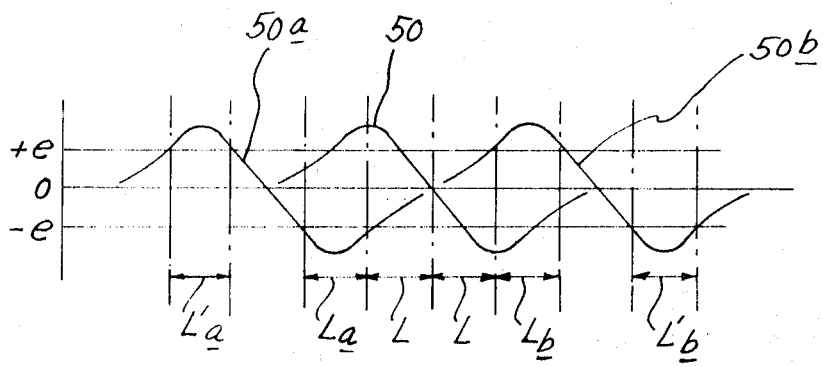
FIG. 10 is a graph similar to that of FIG. 4, but showing the output characteristics of the arrangement shown on FIG. 9.

On FIG. 10, the curve 50 corresponds to the curve shown on FIG. 4 and represents the output voltages from the detecting circuit $D_1$ connected with head $M_1$ for various values of deviation $x_1$, and the curves 50a and 50b represent the output voltages $V_3$ and $V_4$ from detecting circuits $D_3$ and $D_4$ connected with heads $M_3$ and $M_4$ (FIG. 12) also for the various values of deviation $x_1$.

As shown on FIG. 12, the output voltage $V_3$ from detecting circuit $D_3$ may be applied to slicing circuits 51a and 51b which respectively pass signals $S_{3a}$ and $S_{3b}$ only when the voltage output $V_3$ exceeds the negative value $-e$ and only when the voltage output $V_3$ exceeds the positive value $+e$ indicated on FIG. 10. Such signals $S_{3a}$ and $S_{3b}$ are respectively applied to motor control circuit 46, so as to override the effect of signals $S\theta$ and $Sx_o$ in the latter, and to a braking circuits 53 which is operative to engage brakes (not shown) of vehicle 40 upon reception of signal $S_{3b}$. Similarly, the output voltage $V_4$ from detecting circuit $D_4$ may be applied to slicing circuits 52a and 52b which respectively pass signals $S_{4a}$ and $S_{4b}$ only when the voltage output $V_4$ exceeds the positive valve $+e$ and only when the voltage output $V_4$ exceeds the negative value $-e$. The signals $S_{4a}$ and $S_{4b}$ are also applied to circuit 46, to override signals $S\theta$ and $Sx_o$ in the latter, and to braking circuit 53.

It will be apparent from FIG. 10 that signals $S_{3a}$ and $S_{4a}$ will occur when the deviation $x_1$ is in the ranges represented at La and Lb, respectively, and will override the effect of signals $S\theta$ and $Sx_o$ in circuit 46 so that motor $E_1$ is operated in suitable direction to steer the vehicle for return to within the range where $x_1$ is less than L. If, however, for any reason, such as a mal-function of the steering mechanism, the deviation $x_1$ rises to within the ranges indicated at $L'_a$ and $L'_b$ on FIG. 10, then the produced signal $S_{3b}$ or $S_{4b}$ will stop the vehicle through the operation of braking circuit 53.

In addition to controlling the steering of vehicle 40 so that the latter follows the course defined by magnetized element 41, a system according to this invention may control the acceleration, deceleration and stopping of the vehicle as the latter moves along such course. For example, as shown on FIG. 7, magnetic flux responsive heads Ma, Mb and Mc may be mounted on vehicle 40 so as to move in respective paths as the vehicle moves along the course defined by element 41. The heads Ma, Mb and Mc are respectively connected with detecting circuits Da, Db and Dc which provide voltage outputs only when the respective heads are proximate to magnetized members A, B and C which are suitably located along the desired course in the paths of heads Ma, Mb and Mc, respectively. The outputs from detecting circuits Da, Db and Dc are applied to the motor control circuit 47 (FIG. 11) so as to respectively cause stopping of the driving motor $E_2$, deceleration or reduction of the speed of motor $E_2$ and acceleration or increase of the speed of motor $E_2$. Further, a manually operated starting circuit 54 may be provided to initiate operation of motor $E_2$ after the vehicle 40 has been brought to a stop by the cooperation of head Ma with one of the magnetized members A.

With the above arrangement, magnetic members $B_1$, $B_2$ and $B_3$ may be provided in advance of the curved portions of the course defined by element 41 to reduce the speed of vehicle 40 when detected by head Mb and thereby to ensure travel around the curves at a safe speed. Another magnetic member $B_4$ may be located in advance of the end of the desired course to reduce the speed of vehicle 40 preparatory to stopping at such end or terminal. Magnetic members $A_1$ and $A_2$ may be located at a desired station along the predetermined course and at the end of that course, respectively, for stopping the vehicle when detected by head Ma. Further, magnetic members $C_1$, $C_2$ and $C_3$ may be located after each curved portion of the course for causing acceleration of vehicle 40 when detected by head Mc, that is, for again increasing the vehicle speed after such speed has been reduced for travel around each curve.

Although illustrative embodiments of this invention have been described in detail herein with reference to the accompanying drawings, it is to be understood that the invention is not limited to those precise embodiments, and that various changes and modifications may be made therein by one skilled in the art without departing from the scope or spirit of the invention.

What is claimed is:

1. A control system for directing a movable vehicle along a predetermined course on a supporting surface, comprising an elongated, transversely magnetized guiding element extending along the predetermined course, a steerable vehicle movable over said surface, first and second dual-gap magnetic flux responsive heads spaced apart on said vehicle in the direction of movement of the latter, each of said heads being mounted on said vehicle to dispose the gaps of said head proximate to said magnetized guiding element with the direction across said gaps extending substantially transversely with respect to said guiding element, circuit means connected with said heads and providing control signals indicative of the deviation of said vehicle from said course, and means responsive to said control signals to steer said vehicle for return of the latter to said course.

2. A control system according to claim 1, further comprising driving means for effecting the movement of said vehicle along said course, and means controlling said driving means in accordance with a predetermined program at selected locations along said course.

3. A control system according to claim 2, in which said means controlling the driving means includes additional magnetic flux responsive head means on said vehicle and magnetized members at said selected locations along the course detectable by said additional head means to cause deceleration, acceleration and stopping, respectively, of said vehicle.

4. A control system according to claim 1, in which said first and second heads are located on said vehicle so as to be centered with respect to said magnetized guiding element when said vehicle is correctly positioned with respect to said course.

5. A control system according to claim 4, in which said circuit means includes subtractive and additive circuit means each receiving the outputs of said first and second heads and producing respective control signals indicative of angular deviation of said vehicle with respect to said course and of lateral deviation of said vehicle with respect to said course.

6. A control system according to claim 5, further including third and fourth dual-gap magnetic flux responsive heads mounted on said vehicle as aforesaid and being spaced apart laterally at opposite sides of said first and second heads so as to be influenced by the magnetic filed from said magnetized guiding element upon deviation of said vehicle from said course by distances in excess of predetermined values, and circuit means responsive to the influencing of said third and fourth heads by said magnetic field to produce overriding control signals which cause steering of the vehicle in corresponding directions for returning said deviation to within said predetermined values.

7. A control system according to claim 6, further comprising means to half the movement of said vehicle, and means responsive to the influencing of said third and fourth heads by said magnetic field to cause said means to halt movement of the vehicle when the deviation of said vehicle from said course is still greater than said distances in excess of predetermined values.

8. A control system for directing a movable vehicle along a predetermined course on a supporting surface, comprising an elongated, transversely magnetized guiding element extending along the predetermined course, a steerable vehicle movable over said surface, dual-gap magnetic flux responsive head means mounted on said vehicle to dispose the gaps of said head means proximate to said magnetized guiding element with the direction across said gaps extending substantially transversely with respect to said guiding element, circuit means connected with said head means and providing control signals indicative of the deviation of said vehicle from said course, means responsive to said control signals to steer said vehicle for return of the latter to said course, additional dual-gap magnetic flux responsive head means mounted on said vehicle as aforesaid, and circuit means connected with said additional head means to provide respective additional control signals indicative of said deviation of the vehicle from said course beyond a predetermined range of deviations, said additional control signals being effective to override the first mentioned control signals and to cause steering of the vehicle in directions for returning said deviation of the vehicle to within said range.

9. A control system according to claim 8, further comprising means to halt the movement of said vehicle, and circuit means to cause the last mentioned means to halt said movement when said additional head means detect a deviation of said vehicle from said course which is in excess of a predetermined distance beyond said predetermined range.

* * * * *